United States Patent
Segawa et al.

(10) Patent No.: US 7,616,344 B2
(45) Date of Patent: Nov. 10, 2009

(54) IMAGE PROCESSING APPARATUS AND METHOD FOR PRINTING AND PLATE MAKING, AND RECORDING MEDIUM HAVING IMAGE PROCESSING PROGRAM RECORDED THEREIN FOR PRINTING AND PLATE MAKING

(75) Inventors: Hiroyuki Segawa, Kyoto (JP); Minoru Sawada, Kyoto (JP)

(73) Assignee: Dainippon Screen Mfg., Co., Ltd., Kyoto (JP)

( * ) Notice: Subject to any disclaimer, the term of this patent is extended or adjusted under 35 U.S.C. 154(b) by 465 days.

(21) Appl. No.: 11/727,470

(22) Filed: Mar. 27, 2007

(65) Prior Publication Data
US 2007/0229916 A1    Oct. 4, 2007

(30) Foreign Application Priority Data
Mar. 30, 2006   (JP) ............................ P2006-093906

(51) Int. Cl.
*H04N 1/60* (2006.01)
*G06K 15/00* (2006.01)
*H04N 1/409* (2006.01)
*B41C 1/02* (2006.01)
*G06K 9/00* (2006.01)

(52) U.S. Cl. ............ 358/1.9; 358/3.29; 358/3.26; 358/1.17; 358/515; 382/162; 382/165; 382/167

(58) Field of Classification Search .......... 358/1.9, 358/1.17, 3.29, 3.26, 515; 382/162, 165, 382/167
See application file for complete search history.

(56) References Cited

U.S. PATENT DOCUMENTS

| | | | |
|---|---|---|---|
| 5,542,052 A  * | 7/1996 | Deutsch et al. | 345/589 |
| 6,594,030 B1 | 7/2003 | Ahlstrom et al. | |
| 7,555,712 B2 * | 6/2009 | Croft et al. | 715/247 |

* cited by examiner

*Primary Examiner*—Edward L Coles
*Assistant Examiner*—Charlotte M Baker
(74) *Attorney, Agent, or Firm*—McDermott Will & Emery LLP

(57) ABSTRACT

For page data containing shadow-casting objects, trap graphics are generated according to the following procedure. First, an ID drawing process is performed for all objects within a page, and based on the process result, a related graphic list indicating relative positional relationships between the objects is generated. Thereafter, an ID drawing process is performed for all objects in the area of each shadow-casting object, excluding the shadow-casting object. The result of the ID drawing process in the shadow-casting object area is reflected in the related graphic list, and thereafter, trap graphics are generated based on settings information in the related graphic list.

15 Claims, 16 Drawing Sheets

AREA OF SHADOW-CASTING OBJECT

IMAGE PROCESSING APPARATUS AND METHOD FOR PRINTING AND PLATE MAKING, AND RECORDING MEDIUM HAVING IMAGE PROCESSING PROGRAM RECORDED THEREIN FOR PRINTING AND PLATE MAKING

BACKGROUND OF THE INVENTION

1. Field of the Invention

The present invention relates to image processing apparatuses and methods for printing and plate making, and more specifically to trapping technology for image data containing a translucent image (a translucent object).

2. Description of the Background Art

In the field of printing and plate making, a personal computer or the like is used to first perform an edit process based on characters that are to be contained in a print and a plurality of types of other print elements, such as logos, patterns, and illustrations, and generate page data containing a print target written in a page-description language. Thereafter, a RIP process is performed on the page data to generate image data for use in production of a plate (a press plate) that is to be placed in a printing machine.

By the way, in the case of multicolor printing, in order to prevent an underlying portion from being exposed in a boundary between colors due to register movement, a trapping process is performed before performing the RIP process on the page data. The trapping process is to dispose, along a boundary portion between two adjacent colors on an image, a hairline graphic (hereinafter, referred to as a "trap graphic"), which has a color containing color elements from both sides of the boundary portion. For example, in the case where a Y color graphic object 71, a C color graphic object 72, and an M color graphic object 73 are located so as to overlap with each other as shown in FIG. 11A, the trapping process generates trap graphics 74a to 74c in boundary portions between the overlapping graphic objects as shown in FIG. 11B.

The procedure of the trapping process is described below by taking as an example the case where the three color graphic objects 71, 72, and 73 are present within a page as shown in FIG. 11A. Note that these graphic objects are arranged in the order, from bottom (back) to top (front), the Y Color graphic object 71, the C color graphic object 72, the M color graphic object 73.

Performed first is a process for correlating each pixel within a display area with a graphic object that is to be displayed by the pixel (hereinafter, referred to as an "ID drawing process") In the ID drawing process, each graphic object is assigned a unique identification number (hereinafter, referred to as "ID"). For example, in the case where n graphic objects are present within a page, the graphic objects are assigned IDs "1", "2", . . . , "n" in order from bottom (back) to (front). In the example shown in FIG. 11A, the graphic objects 71, 72, and 73 are assigned "1", "2", and "3", respectively.

Once each graphic object is assigned an ID, ID drawing is performed for each pixel of the graphic objects in order from lowest ID to highest ID (i.e., in order from bottommost to topmost) In the example shown in FIG. 11A, the ID drawing is first performed for the Y color graphic object 71. This leads to a drawing result as shown in FIG. 12A. Next, the ID drawing is performed on the C color graphic object 72. In this case, for pixels in the area where the Y color graphic object 71 and the C color graphic object 72 overlap, the ID of the Y color graphic object 71 is overwritten by the ID of the C color graphic object 72. This leads to a drawing result as shown in FIG. 12B. Further, the ID drawing is performed on the M color graphic object 73. In this case also, the ID of the Y color graphic object 71 and the ID of the C color graphic object 72 are overwritten. This leads to a drawing result as shown in FIG. 12C. Thus, the ID drawing process is completed.

After the ID drawing process, a list (hereinafter, referred to as a "related graphic list") that indicates overlapping of the graphic objects (relative positional relationships in the vertical direction) is generated. FIG. 13 is a diagram schematically illustrating a related graphic list generated in the example shown in FIG. 11A. As shown in FIG. 13, an upward direction related graphic listing and a downward direction related graphic listing are generated for each graphic object within the page. The related graphic list is generated in the following manner based on the drawing result (hereinafter, referred to as the "ID drawing result") obtained by the ID drawing process as shown in FIG. 12C.

First, each pixel within the display area is scanned, focusing on "ID=1". In this case, if an ID other than "1" is drawn for any pixel adjacent to a pixel for which "1" is drawed, the ID is added to the upward direction related graphic listing. In FIG. 12C, "1" is adjacent to "2" and "3", and therefore "2" and "3" are added to the upward direction related graphic listing for the graphic object with "ID=1" as shown in FIG. 13.

Next, each pixel within the display area is scanned, focusing on "ID=2". In this case, when an ID other than "2" is drawn for any pixel adjacent to a pixel for which "2" is drawed, the ID is added to the downward direction related graphic listing if the ID has a value less than "2" or to the upward direction related graphic listing if the ID has a value more than "2". Accordingly, as shown in FIG. 13, "3" is added to the upward direction related graphic listing for the graphic object with "ID=2" and "1" is added to the downward direction related graphic listing for the graphic object with "ID=2".

Further, a similar operation is performed for "ID=3". As such, the related graphic list as shown in FIG. 13 is generated. More specifically, the upward direction related graphic listing and downward direction related graphic listing are formed of structures called "related cells". For example, the downward direction related graphic listing for the graphic object with "ID=3" consists of a related cell for "ID=2" and a related cell for "ID=1" as shown in FIG. 14.

After the related graphic list is generated, trap attributes are set in the "related cell" structures based on predetermined setting information, and trap graphics are generated between graphic objects based on the contents of the settings. Thus, any underlying portion is suppressed from being exposed in color boundary portions due to register movement at the time of multicolor printing.

Note that Japanese Laid-Open Patent Publication No. 9-106460 discloses an example of generating the related graphic list.

By the way, in some cases, in order to give a three-dimensional appearance to graphics, an object for casting a shadow, for example, around the graphics (hereinafter, referred to as a "shadow-casting object") is used. In such a case, there is a possibility that desired trap graphics might not be generated. This is described with reference to FIG. 15. In FIG. 15, a plurality of C color graphic objects 81, a plurality of M color graphic objects 82, and a Y color graphic object 83 are present within a page. In addition, these objects are arranged in the order, from bottom (back) to top (front), the C color graphic objects 81, the M color graphic objects 82, the Y color graphic object 83. In such a case, in order to give a three-dimensional appearance to the Y color graphic object 83, a shadow-casting object 84 may be placed below (on the backside relative to)

the Y color graphic object 83 but above (on the frontside relative to) the M color graphic objects 82 (i.e., between the M color graphic objects 82 and the Y color graphic object 83) to display a shadow, while gradually reducing color density in the directions indicated by the arrows in FIG. 15.

The shadow-casting object 84 is an object visually recognized on the screen as a translucent graphic. Therefore, the graphic objects 81 and 82 located below (on the backside relative to) the shadow-casting object 84 are also visually recognized on the screen. However, data for the object covering the area denoted by reference numeral 84 in FIG. 15 is present. Therefore, the graphic objects 81 and 82, which are present, for example, in the area denoted by reference numeral 86 in FIG. 15, are completely included in the area of the shadow-casting object 84. Accordingly, at the time of the above-described ID drawing process, the IDs of the graphic objects located below (on the backside relative to) the shadow-casting object 84 are overwritten by the ID of the shadow-casting, object 84.

For example, in the case where three graphic objects 91 (ID=1), 92 (ID=2) and 93 (ID=3) and a shadow-casting object 94 (ID=4) are present as shown in FIG. 16, and they are arranged in the order, from bottom (back) to top (front), the graphic object 91, the graphic object 92, the shadow-casting object 94, the graphic object 93, the ID drawing result is as shown in FIG. 17. Although the graphic object 91 is visually recognized on the screen, the ID of the graphic object 91 is overwritten by the ID of the shadow-casting object 94 as shown in FIG. 17.

Accordingly, for the graphic objects located below (on the backside relative to) the shadow-casting object 84 in the example shown in FIG. 15, positional relationships relative to other objects are not acquired, and therefore the trapping process leads to results as shown in FIGS. 18A and 18B. FIG. 18A shows the result for the area denoted by reference numeral 85 in FIG. 15, and FIG. 18B shows the result for the area denoted by reference numeral 86 in FIG. 15. In the area outside the shadow-casting object 84, trap graphics are generated at boundary portions between the graphic objects as shown in FIG. 18A. In the area of the shadow-casting object 84, on the other hand, no trap graphic is generated as shown in FIG. 18B.

Thus, when the shadow-casting object is contained in page data, there is a possibility that desired trap graphics might not be generated.

SUMMARY OF THE INVENTION

Therefore, an object of the present invention is to provide an image processing apparatus and an image processing method that are capable of, even if a shadow-casting object is contained in page data, generating trap graphics in the area of the shadow-casting object.

The present invention has the following features to attain the above object.

An aspect of the present invention is directed to an image processing apparatus for reading page data containing a plurality of objects and a translucent object, and, when two of the plurality of objects overlap, generating a trap graphic in a boundary portion between the two objects, the plurality of objects being graphics as elements constituting a print target, the apparatus including: a first correlation section for correlating each pixel in an image represented by the page data with an object that, under a predetermined condition, is topmost among objects having the pixel in their areas; a second correlation section for correlating each pixel located in an area of the translucent object with an object that, under a predetermined condition, is topmost among objects having the pixel in their areas; and a trap graphic generation section for generating the trap graphic based on a correlation result obtained by the first correlation section and a correlation result obtained by the second correlation section.

With this configuration, each pixel in the entire area of a page is correlated with objects that are located topmost under a predetermined condition by the first correlation section, and each pixel in the area of a translucent object is correlated with objects that are located topmost under a predetermined condition by the second correlation section. Then, trap graphics are generated based on correlation results obtained by the first correlation section and the second correlation section. Therefore, for example, it is possible to, after all objects are correlated with their pixels by the first correlation section, correlate objects located below (on the backside relative to) a translucent object with their pixels by the second correlation section. As a result, it is made possible to acquire relative positional relationships (overlappings) between the objects located below (on the backside relative to) the translucent object and other objects, which cannot be conventionally acquired. Thus, even if the page data contains any translucent object, it is possible to generate trap graphics in portions where no trap graphic can be conventionally generated.

In such an apparatus, it is preferred that the second correlation section correlates each pixel with an object that, under a condition of being located below the translucent object, is topmost among the objects having the pixel in their areas.

With this configuration, it is possible to identify the topmost (frontmost) of the objects located below (on the backside relative to) the translucent object from among the objects having their pixels in the area of the translucent object. Therefore, it is made possible to acquire relative positional relationships between the objects located below (on the backside relative to) the translucent object, which cannot be conventionally acquired. Thus, it is possible to generate trap graphics between the objects located below (on the backside relative to) the translucent object.

In such an apparatus, it is preferred that the second correlation section correlates each pixel with an object that, under a condition of being other than the translucent object, is topmost among the objects having the pixel in their areas.

With this configuration, it is possible to identify the topmost (frontmost) of all objects having their pixels in the area of the translucent object, excluding the translucent object. Therefore, it is made possible to acquire relative positional relationships between the objects located below (on the backside relative to) the translucent object and the objects located above (on the frontside relative to) the translucent object, which cannot be conventionally acquired. Thus, it is possible to generate trap graphics in boundary portions between the objects located below (on the backside relative to) the translucent object and the objects located above (on the frontside relative to) the translucent object.

In such an apparatus, it is preferred that the first correlation section correlates each pixel with an object that, under a condition of being other than and below the translucent object, is topmost among the objects having the pixel in their areas, and the second correlation section correlates each pixel with an object that, under a condition of not being located below the translucent object, is topmost among the objects having the pixel in their areas.

With this configuration, the topmost (frontmost) of the objects located below. (on the backside relative to) the translucent object is identified by the first correlation section in the area of the translucent object, and the topmost (frontmost) of all objects including the translucent object is identified by the second correlation section in the area of the translucent object. Therefore, it is made possible to acquire relative positional relationships between the objects located below (on the backside relative to) the translucent object, which cannot be conventionally acquired. Thus, it is possible to generate trap graphics between the objects located below (on the backside relative to) the translucent object.

In such an apparatus, it is preferred that the first correlation section correlates each pixel with an object that, under a condition of being other than the translucent object, is topmost among the objects having the pixel in their areas, and the second correlation section correlates each pixel with an object that, under a condition of not being located below the translucent object, is topmost among the objects having the pixel in their areas.

With this configuration, it is possible to identify the topmost (frontmost) of all objects having their pixels in the area of the translucent object, excluding the translucent object. Therefore, it is made possible to acquire relative positional relationships between the objects located below (on the backside relative to) the translucent object and the objects located above (on the frontside relative to) the translucent object, which cannot be conventionally acquired. Thus, it is possible to generate trap graphics in boundary portions between the objects located below (on the backside relative to) the translucent object and the objects located above (on the frontside relative to) the translucent object.

Such an apparatus preferably further includes: a positional relationship data generation section for generating positional relationship data, which indicates relative positional relationships between the plurality of objects, based on either one of the correlation result obtained by the first correlation section and the correlation result obtained by the second correlation section; and a positional relationship data update section for, after the positional relationship data is generated by the positional relationship data generation section, updating the positional relationship data based on the other one of the correlation result obtained by the first correlation section and the correlation result obtained by the second correlation section, and the trap graphic generation section preferably generates the trap graphic based on the positional relationship data.

With this configuration, positional relationship data indicating relative positional relationships between objects in the vertical direction is generated, and thereafter the positional relationship data is updated by the positional relationship data update section. Then, trap graphics are generated based on the positional relationship data. Thus, it is possible to implement the process itself of generating the trap graphics with a configuration similar to that used conventionally.

Another aspect of the present invention is directed to a computer-readable recording medium having recorded therein an image processing program for use with an image processing apparatus for reading page data containing a plurality of objects and a translucent object, and, when two of the plurality of objects overlap, generating a trap graphic in a boundary portion between the two objects, the plurality of objects being graphics as elements constituting a print target, the program causing the apparatus to execute: a first correlation step for correlating each pixel in the page data with an object that, under a predetermined condition, is topmost among objects having the pixel in their areas; a second correlation step for correlating each pixel located in an area of the translucent object with an object that, under a predetermined condition, is topmost among objects having the pixel in their areas; and a trap graphic generation step for generating the trap graphic based on a correlation result obtained by the first correlation step and a correlation result obtained by the second correlation step.

Still another aspect of the present invention is directed to an image processing method for reading page data containing a plurality of objects and a translucent object, and, when two of the plurality of objects overlap, generating a trap graphic in a boundary portion between the two objects, the plurality of objects being graphics as elements constituting a print target, the method including: a first correlation step for correlating each pixel in the page data with an object that, under a predetermined condition, is topmost among objects having the pixel in their areas; a second correlation step for correlating each pixel located in an area of the translucent object with an object that, under a predetermined condition, is topmost among objects having the pixel in their areas; and a trap graphic generation step for generating the trap graphic based on a correlation result obtained by the first correlation step and a correlation result obtained by the second correlation step.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the present invention will be described with reference to the accompanying drawings.

<1. Hardware Configuration of the Image Processing Apparatus>

Figure 1:
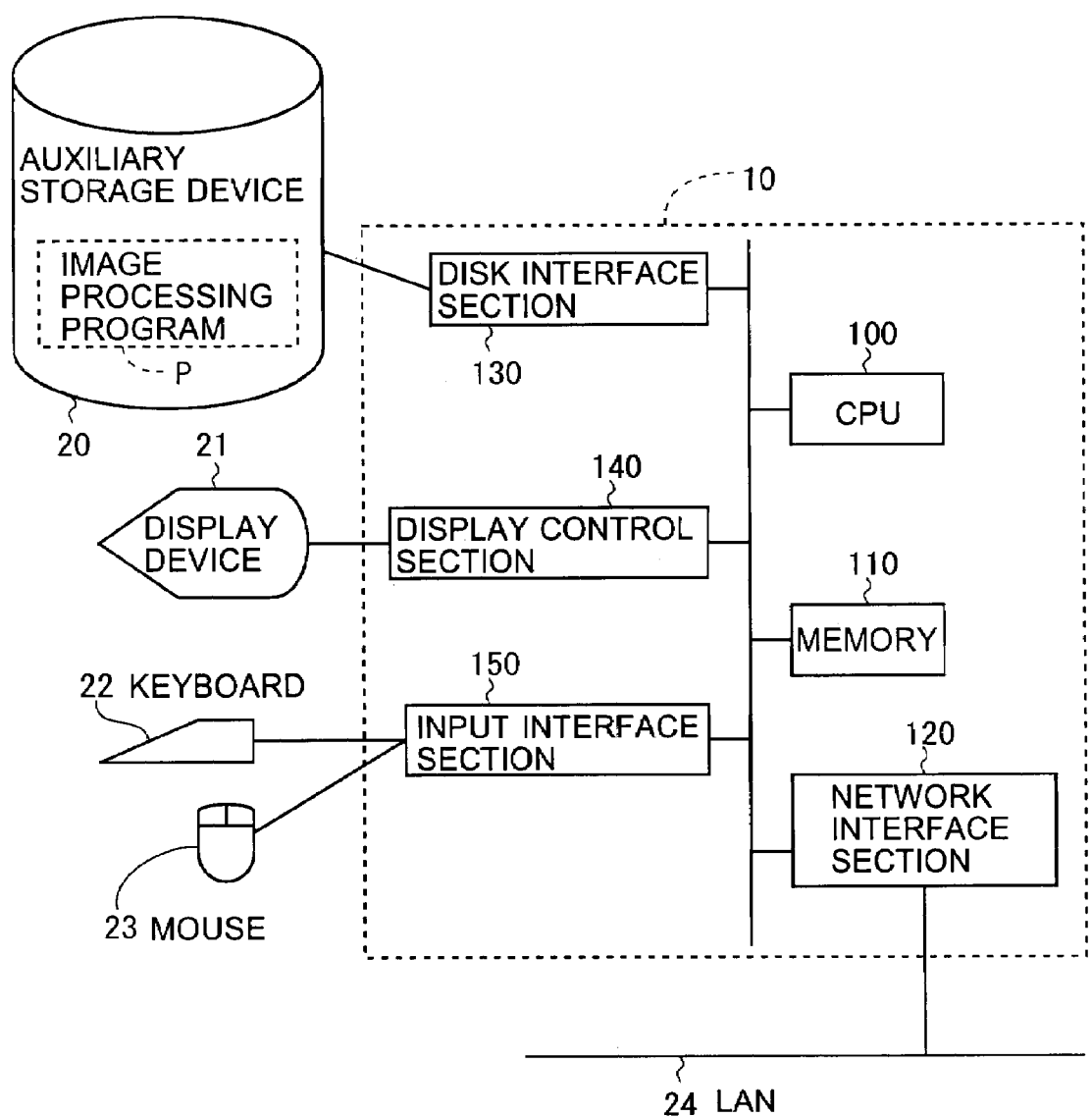
FIG. 1 is a block diagram illustrating a hardware configuration of an image processing apparatus according to an embodiment of the present invention.

FIG. 1 is a block diagram illustrating a hardware configuration of an image processing apparatus according to an embodiment of the present invention. The image processing apparatus is implemented by a personal computer, and includes a main unit 10, an auxiliary storage device 20, a display device 21 such as a CRT, and input devices such as a keyboard 22 and a mouse 23. The personal computer main unit 10 includes a CPU 100, a memory 110 such as a RAM or a ROM, a network interface section 120, a disk interface section 130, a display control section 140, and an input interface section 150. The disk interface section 130 is connected to the auxiliary storage device 20. The display control section 140 is connected to the display device 21. The input interface section 150 is connected to the input devices. The image processing apparatus is connected to a LAN 24 via the network interface section 120.

A program P for image processing (hereinafter, referred to as an "image processing program") is stored in the auxiliary storage device 20, and when the image processing apparatus is activated, the image processing program P is loaded into the memory 110 via the disk interface section 130. Then, the CPU 100 executes the image processing program P to implement image processing for a trapping process. Note that the image processing program P is provided, for example, through a computer-readable recording medium, such as a CD-ROM, which has the program recorded therein. Specifically, after purchasing a CD-ROM as a recording medium containing the image processing program P, the user installs the image processing program P into the auxiliary storage device 20 by inserting the CD-ROM into a CD-ROM drive unit to cause the CD-ROM drive unit to read the image processing program P from the CD-ROM. Alternatively, the image processing program P may be received via the LAN 24, and installed into the auxiliary storage device 20.

<2. Image Processing Method for the Trapping Process>

Figure 2A:
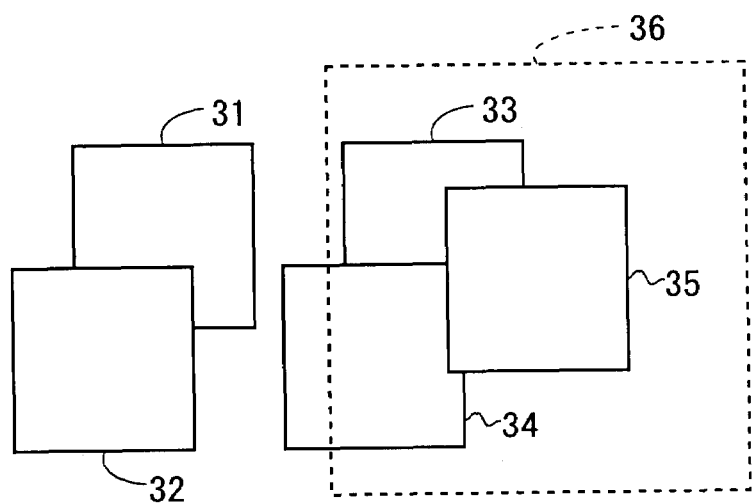
FIGS. 2A to 2C are diagrams for explaining an image processing method in the embodiment.

Next, an image processing method for the trapping process in the present embodiment is outlined. The following description is given on the assumption that objects 31 to 36 as shown in FIG. 2A are present within a page. The objects denoted by reference numerals 31 to 35 are ordinary graphic objects. The object denoted by reference numeral 36 is a shadow-casting object. The graphic object 32 is located above (on the frontside relative to) the graphic object 31. The objects 33 to 36 are arranged in the order, from bottom (back) to top (front), the graphic object 33, the graphic object 34, the shadow-casting object 36, the graphic object 35. In addition, the graphic objects 33, 34 and 35 have a different color from each other. Note that the "shadow-casting object" is meant to indicate a translucent object for casting a shadow, for example, around objects in order to give a three-dimensional appearance to the objects.

Figure 2B:
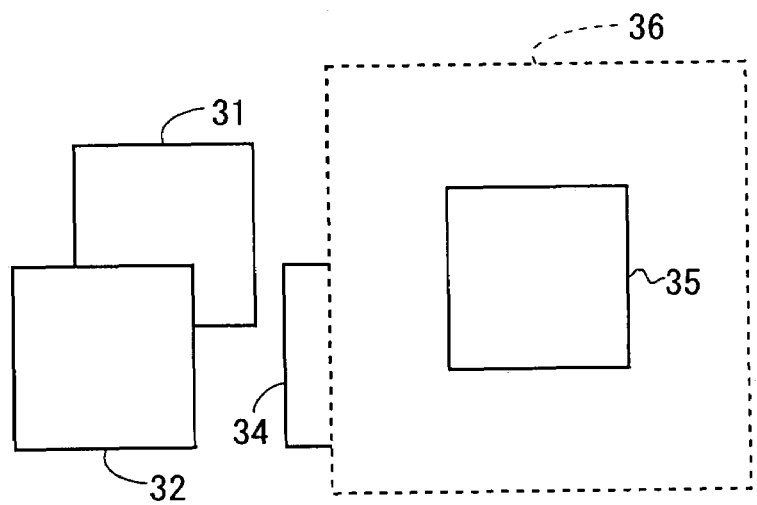

In the present embodiment, an ID drawing process is first performed in the same manner as is conventionally done. Then, a related graphic list is generated based on the ID drawing result. Here, the graphic object 33 is located below (on the backside relative to) the shadow-casting object 36, such that the entire area thereof lies within the area of the shadow-casting object 36, and therefore the positional relationship between the graphic object 33 and the graphic object 34 and the positional relationship between the graphic object 33 and the graphic object 35 are not acquired. In addition, the graphic object 34 is located below (on the backside relative to) the shadow-casting object 36, such that a portion thereof lies within the area of the shadow-casting object 36, and therefore the positional relationship between the graphic object 34 and the graphic object 35 is not acquired. Accordingly, the ID drawing leads to a result similar to that obtained in the case where objects as shown in FIG. 2B are present within the page, and the related graphic list is generated based on such an ID drawing result.

Figure 2C:
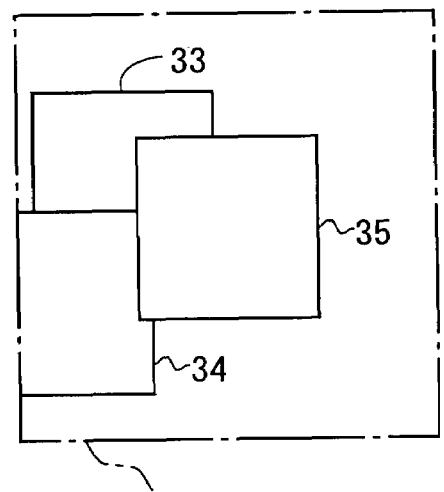
Figure 3:
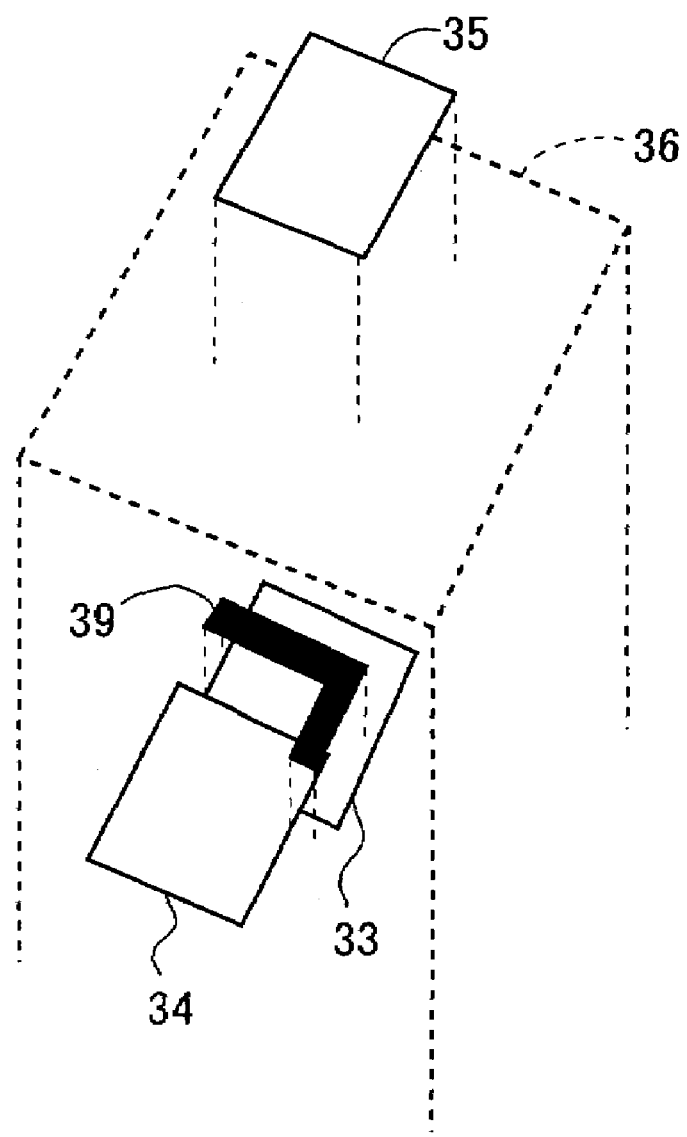
FIG. 3 is a diagram schematically illustrating generation of a trap graphic in the embodiment.

Next, an ID drawing process is performed for all the objects in the area of the shadow-casting object 36, excluding the shadow-casting object 36, as shown in FIG. 2C. Then, based on the ID drawing result obtained by the ID drawing process, the relative positional relationship between the objects in the area of the shadow-casting object 36 is added to the related graphic list. In this manner, for each object located below (on the backside relative to) the shadow-casting object 36, positional relationships relative to other objects located below (on the backside relative to) the shadow-casting object 36 are acquired. As a result, for example, a trap graphic 39 is generated in the boundary portion between the graphic object 33 and the graphic object 34 as schematically shown in FIG. 3.

<3. Procedure of Image Processing for the Trapping Process>

Figure 4:
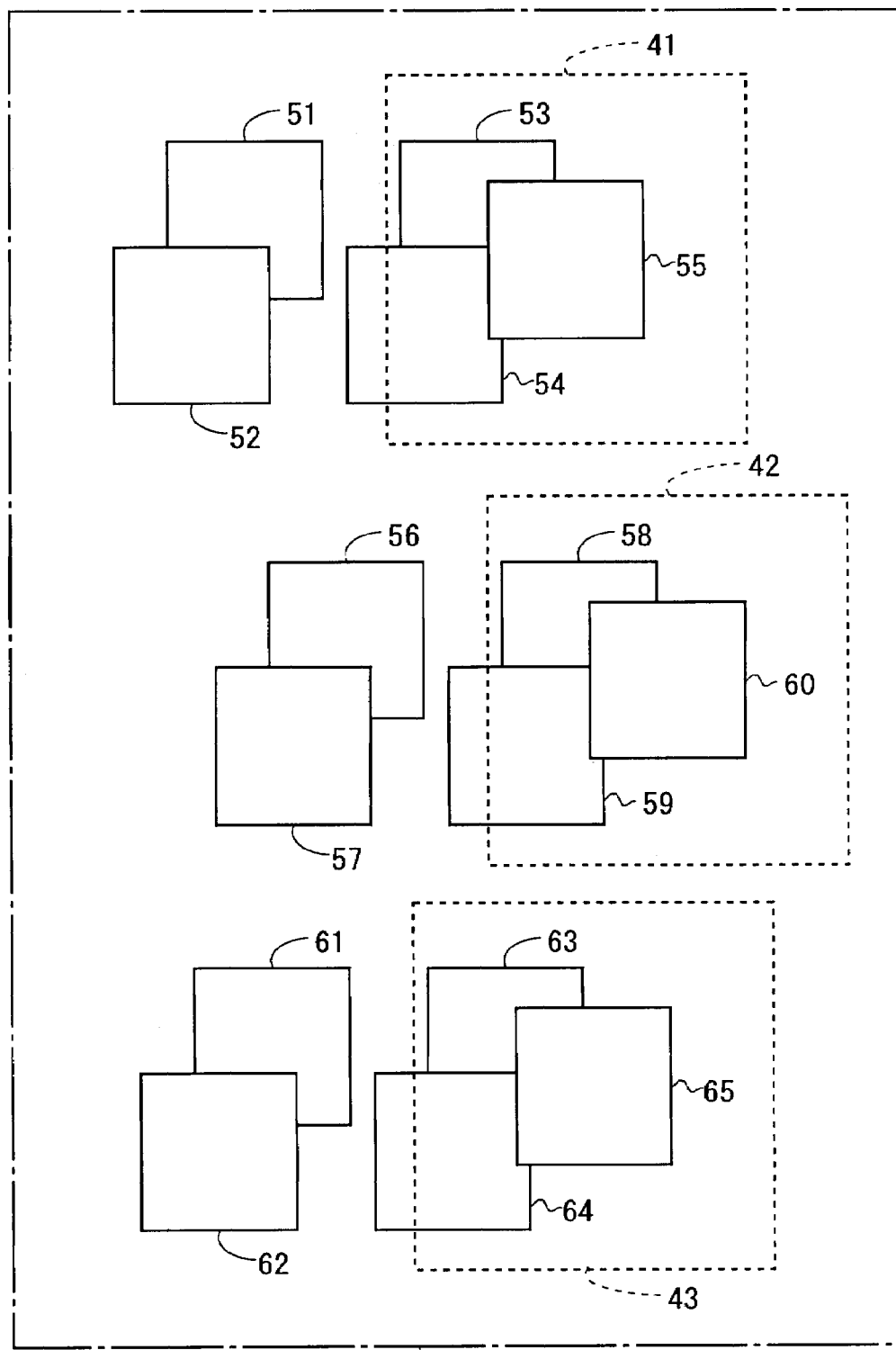
FIG. 4 is a diagram illustrating graphic objects and shadow-casting objects that are present within a page in the embodiment.

Described next is a detailed procedure of image processing for the trapping process in the present embodiment. The following description is given on the assumption that objects 41 to 43 and 51 to 65 as shown in FIG. 4 are present within a page. The objects denoted by reference numerals 51 to 65 are ordinary graphic objects. The objects denoted by reference numerals 41 to 43 are shadow-casting objects. Note that the graphic object 52 is located above (on the frontside relative to) the graphic object 51. The positional relationship between the graphic objects 56 and 57 and the positional relationship between the graphic objects 61 and 62 are similar to the positional relationship between the graphic objects 51 and 52. In addition, the shadow-casting object 41 and the graphic objects 53 to 55 are arranged in the order, from bottom (back) to top (front), the graphic object 53, the graphic object 54, the shadow-casting object 41, the graphic object 55. The shadow-casting object 42 and the graphic objects 58 to 60 are arranged in a similar order, and the shadow-casting object 43 and the graphic objects 63 to 65 are also arranged in a similar fashion.

<3.1 Overall Flow>

Figure 5:
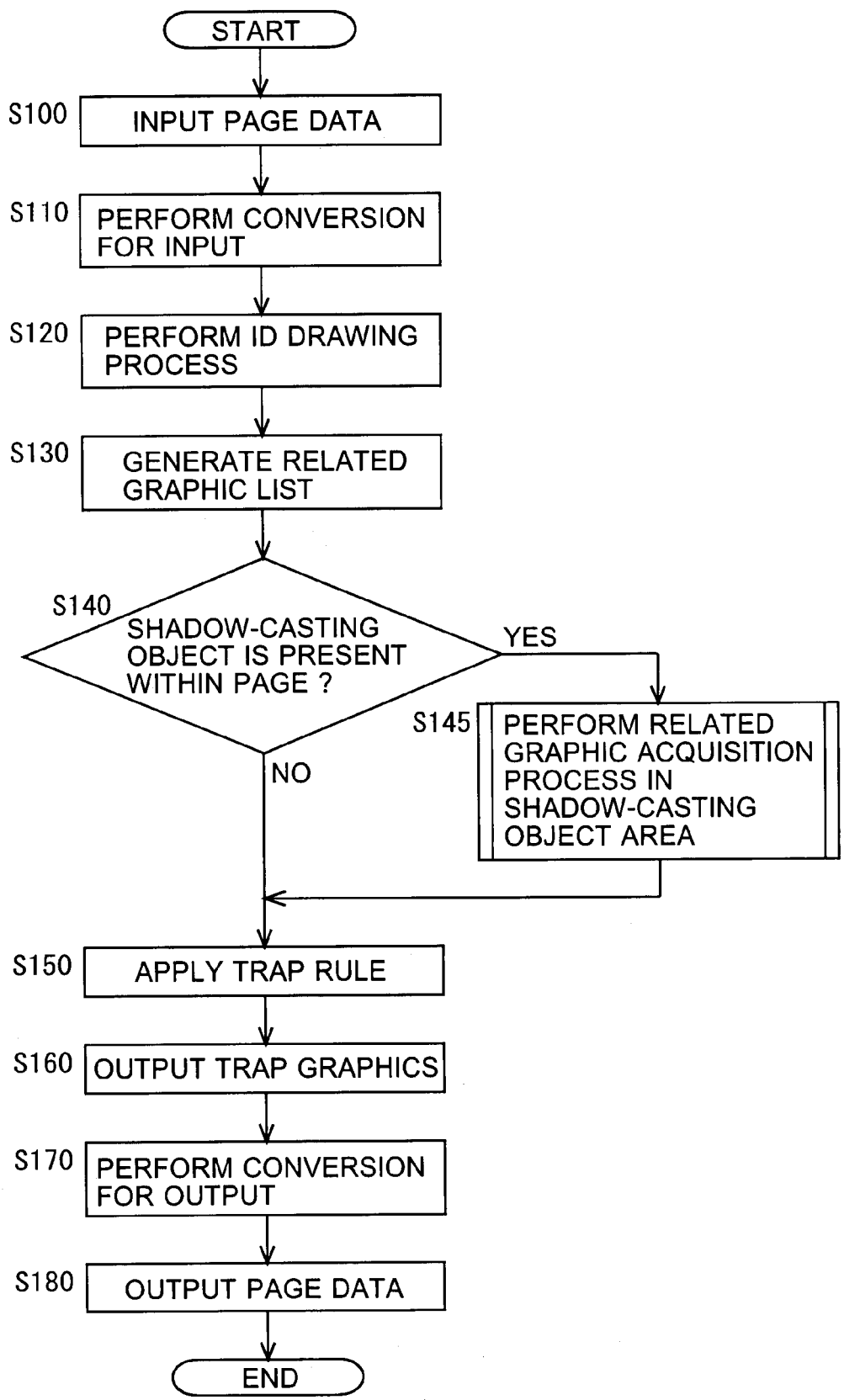
FIG. 5 is a flowchart illustrating the overall process procedure of image processing for a trapping process in the embodiment.

FIG. 5 is a flowchart illustrating the overall process procedure of the image processing for the trapping process in the present embodiment. In the present embodiment, after page data containing a print target written in a page-description language is stored as a file to the auxiliary storage device 20, the image processing program P is activated through operation by the operator. Hereinbelow, the operation of the CPU 100 will be described.

The CPU 100 first loads page data, which is written in a page-description language in the format of, for example, PostScript (registered trademark of Adobe Systems Incorporated in the United States) or PDF (Portable Document Format), from the auxiliary storage device 20 to the memory 110 (step S100). Then, depending on the format of the loaded page data, the data is internally converted to a format that can be handled by the image processing program P according to the present embodiment (step S110).

Figure 6:
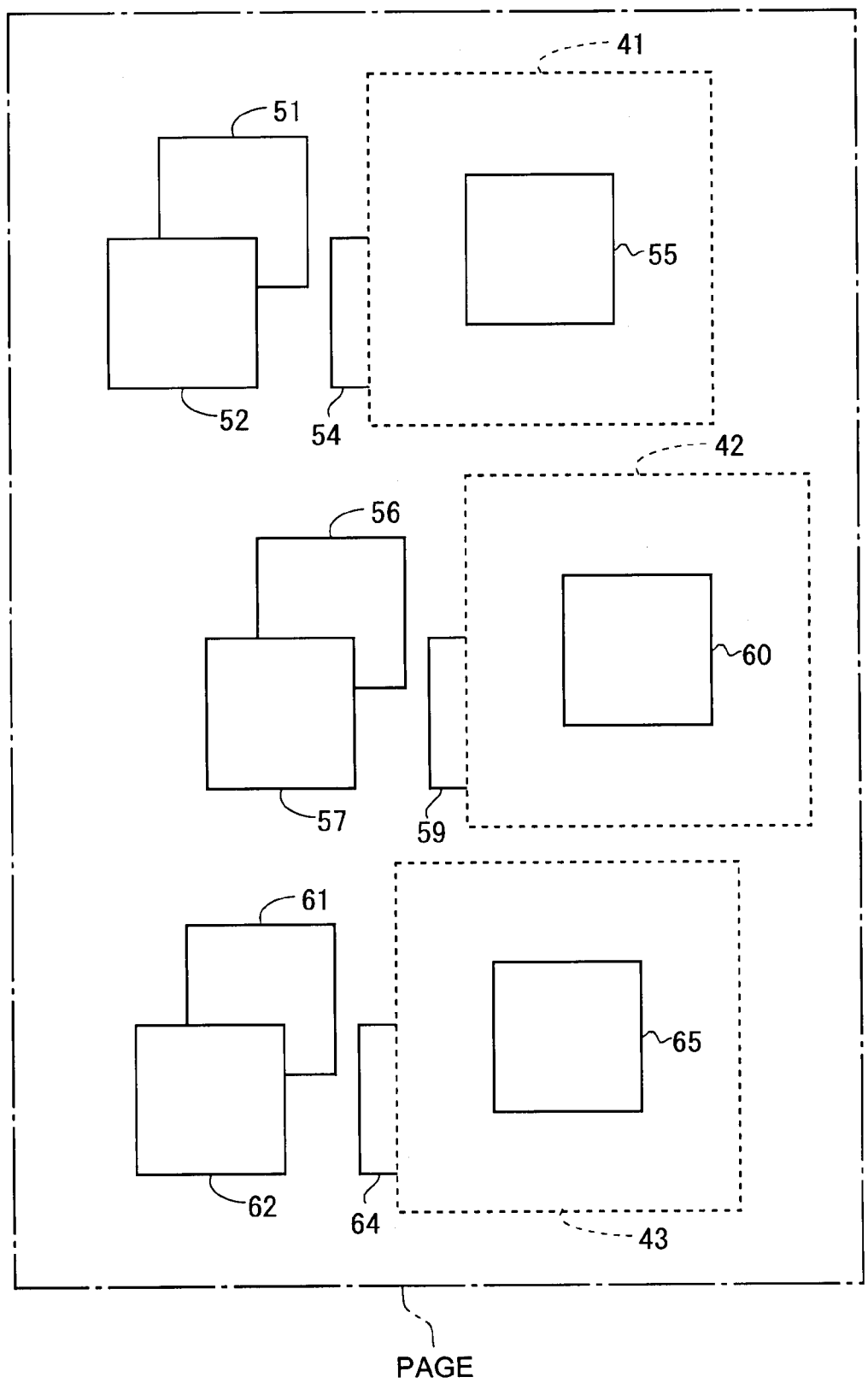
FIG. 6 is a diagram for explaining an ID drawing result in the embodiment.

After the internal conversion of the data, an ID drawing process is performed on the converted data (step S120). This leads to an ID drawing result similar to the result obtained in the case where objects as shown in FIG. 6 are present within a page. Specifically, pixels for graphic objects located below (on the backside relative to) a shadow-casting object are overwritten by the ID of the shadow-casting object even if the pixels are located in an area where the graphic objects are visually recognized on the screen. For example, the ID of the graphic object 53 is overwritten by the ID of the shadow-casting object 41.

After the ID drawing process, a related graphic list as positional relationship data is generated based on the ID drawing result obtained in step S120 (step S130). In this case, for the graphic objects located below (on the backside relative to) the shadow-casting object, positional relationships relative to other graphic objects are not acquired. For example, in the area of the shadow-casting object 41, the positional relationship between the graphic object 53 and the graphic object 54, the positional relationship between the graphic object 53 and the graphic object 55, and the positional relationship between the graphic object 54 and the graphic object 55 are not acquired.

After the generation of the related graphic list, it is determined whether any shadow-casting object is present within the page (step S140). If the determination result is that any shadow-casting object is present, the procedure proceeds to step S145. On the other hand, if there is no shadow-casting object, the procedure proceeds to step S150. In step S145, a process for acquiring relative positional relationships between objects in the area of the shadow-casting object (hereinafter, referred to as a "related graphic acquisition process") is performed. Note that the related graphic acquisition process performed in step S145 will be described in detail later. After step S145, the procedure proceeds to step S150.

Figure 14:
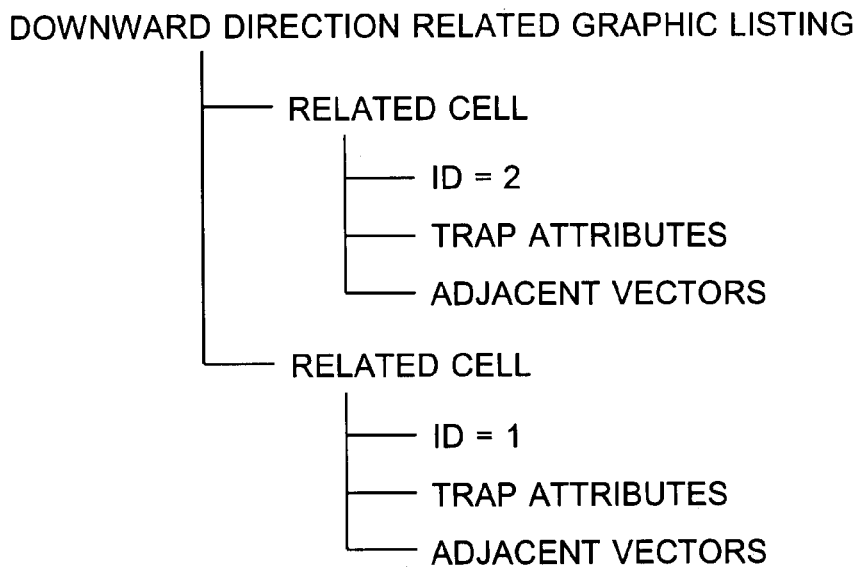
FIG. 14 is a diagram for explaining a detailed configuration of a downward direction related graphic listing in the conventional example.
Figure 15:
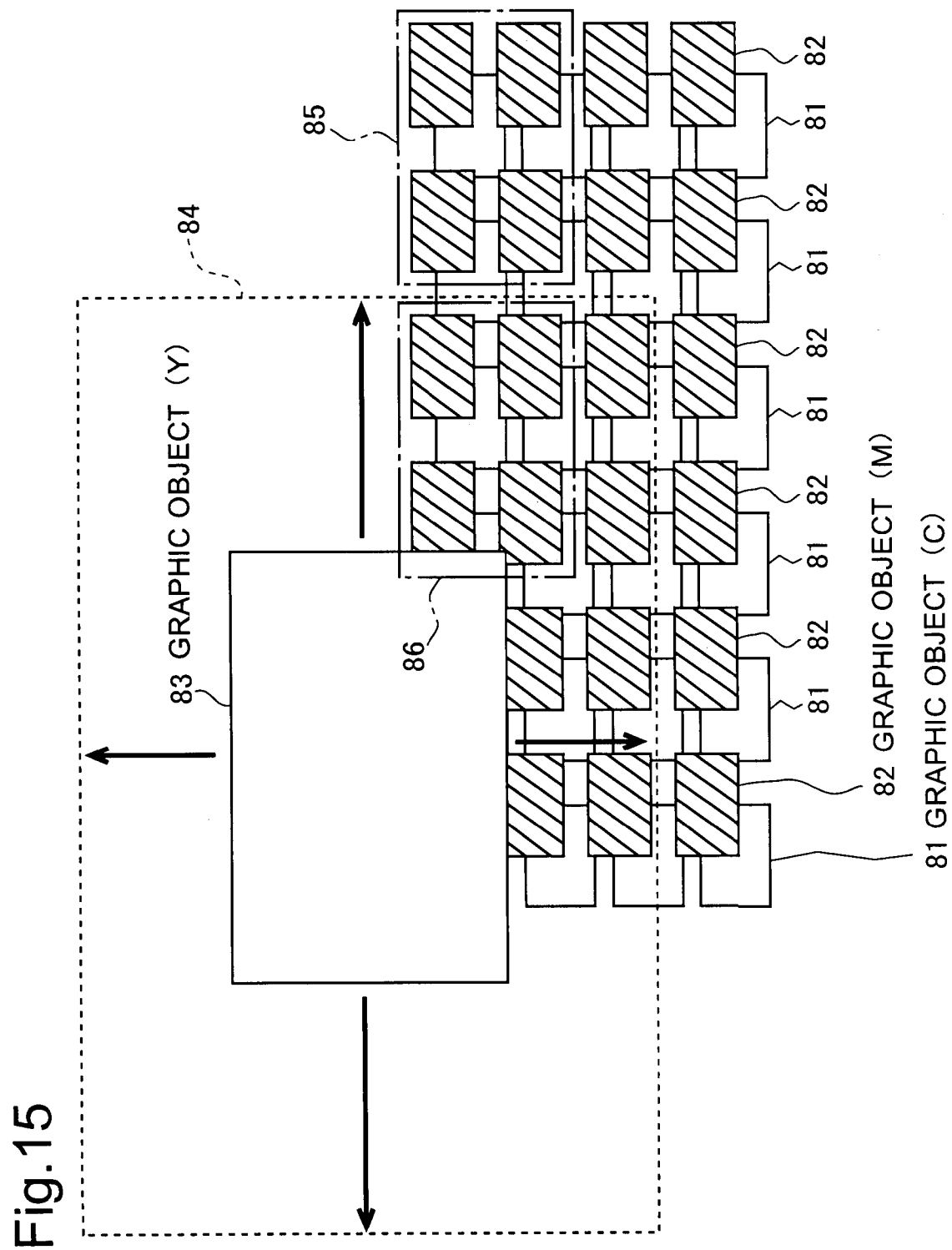
FIG. 15 is a diagram for explaining a trapping process that is performed when a shadow-casting object is present in the conventional example.
Figure 16:
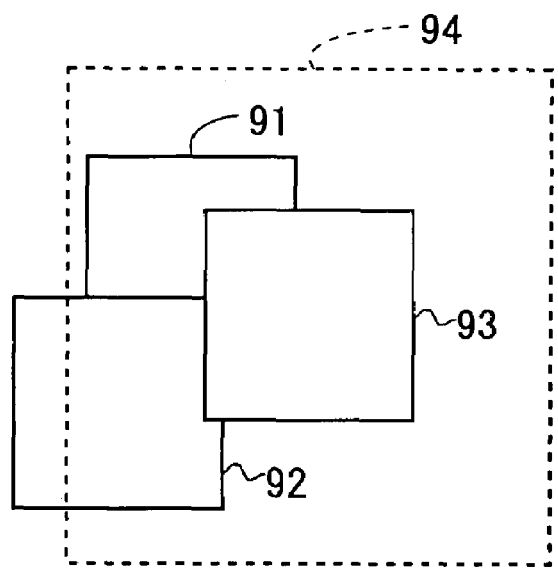
FIG. 16 is a diagram for explaining an ID drawing process that is performed when a shadow-casting object is present in the conventional example.
Figure 17:
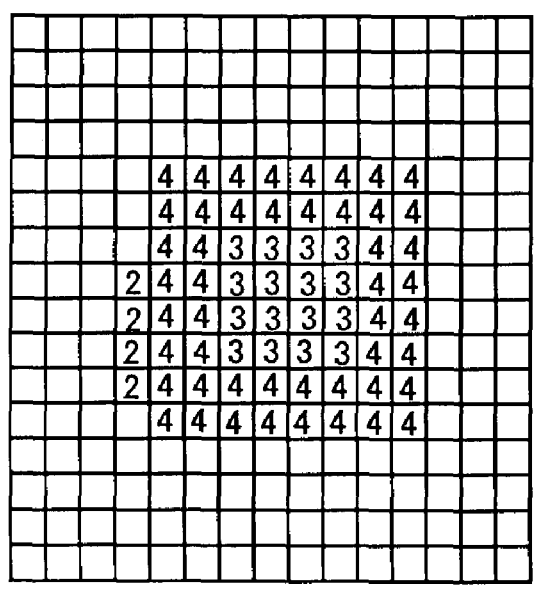
FIG. 17 is a diagram illustrating a result of the ID drawing process that is performed when a shadow-casting object is present in the conventional example.
Figure 18A:
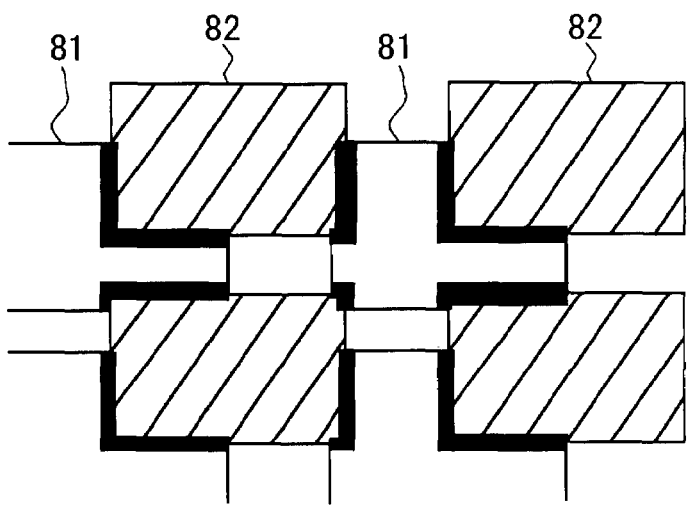
FIGS. 18A and 18B are diagrams each illustrating a result of the trapping process that is performed when a shadow-casting object is present in the conventional example.
Figure 18B:
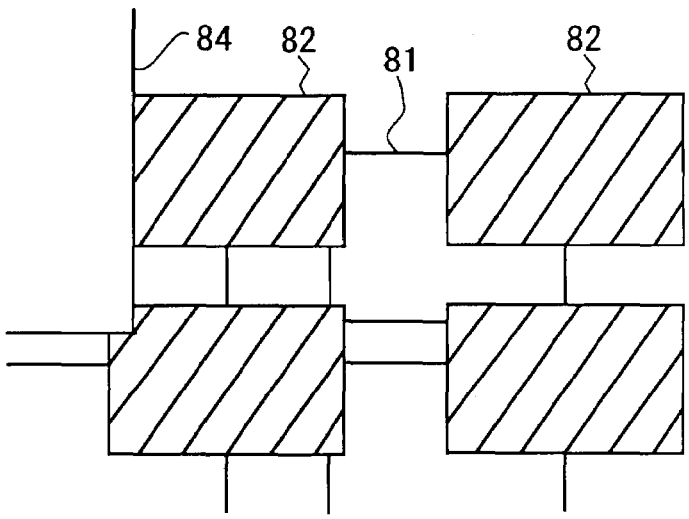

In step S150, a trap rule is applied to all the objects within the page. The "trap rule" as used herein means settings information previously defined for determining attributes (color, width, etc.) of trap graphics. Also, the "application of the trap rule" means determining (setting) attributes for each trap graphic that is to be generated based on the trap rule. Specifically, trap attributes are recorded (set) in the "related cell" structures of the related graphic list shown in FIG. 14.

After the application of the trap rule, for all the objects within the page, trap graphics are outputted based on the trap attributes that are recorded in the "related cell" structures of the related graphic list (step S160). Thereafter, depending on the format of the page as output data, data conversion is performed (step S170), and the page data subjected to the trapping process is outputted to the auxiliary storage device 20 (step S180). Thus, the image processing for the trapping process is completed.

Note that in the present embodiment, a first correlation section (step) is implemented by step S120, a positional relationship data generation section (step) is implemented by step S130, and a trap graphic generation section (step) is implemented by steps S150 and S160.

<3.2 Related Graphic Acquisition Process in the Shadow-Casting Object Area>

Figure 7:
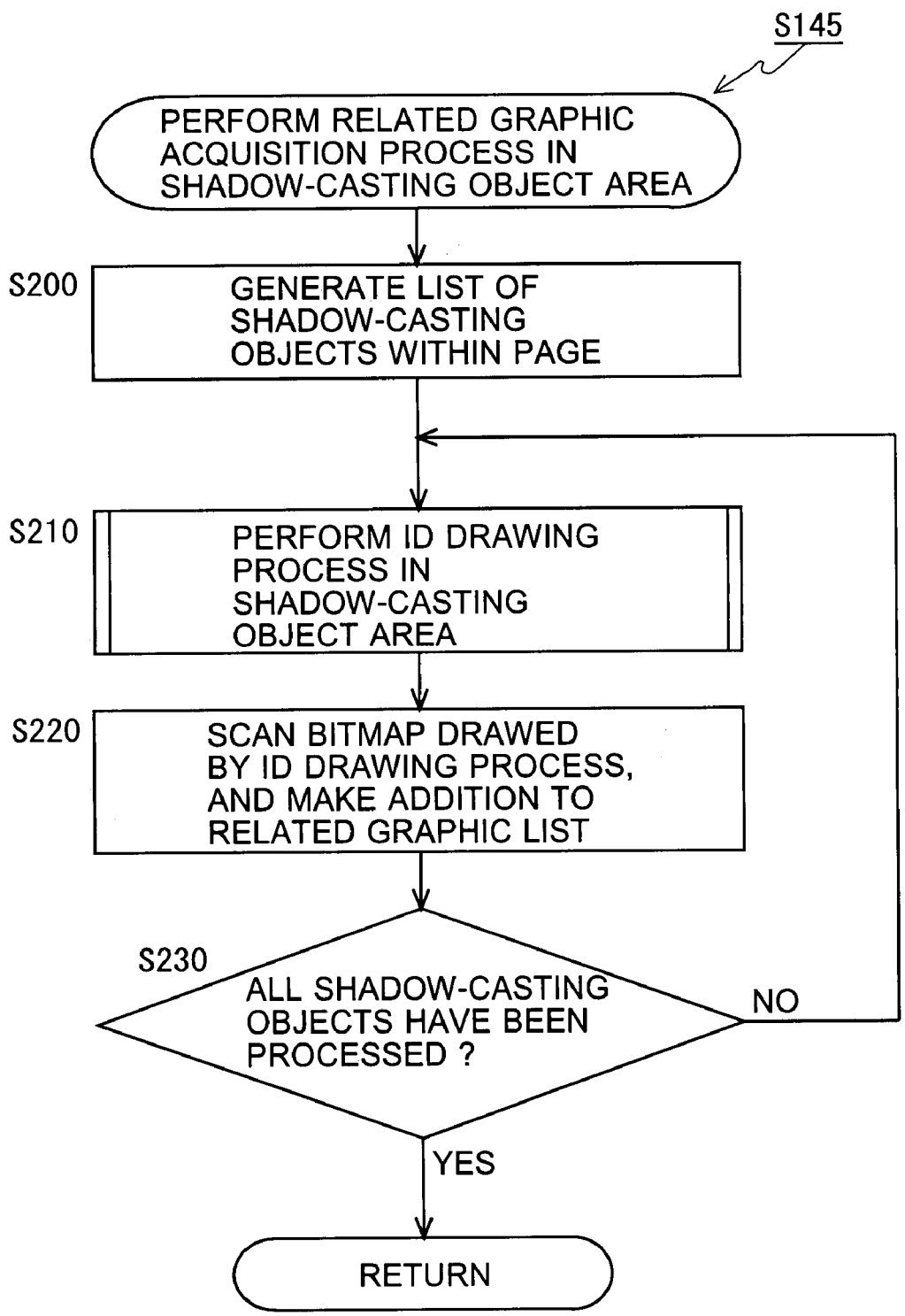
FIG. 7 is a flowchart illustrating a detailed procedure of a related graphic acquisition process in a shadow-casting object area in the embodiment.

FIG. 7 is a flowchart illustrating a detailed procedure of the related graphic acquisition process in the shadow-casting object area (step S145 in FIG. 5). After the related graphic acquisition process is started, the CPU 100 first extracts any shadow-casting objects contained within the page, and generates a list of the extracted shadow-casting objects (hereinafter, referred to as a "shadow-casting object list") (step S200). In the example shown in FIG. 4, a shadow-casting object list containing three shadow-casting objects 41, 42, and 43 is generated. Therefore, the below-described processing from steps S210 to S230 is repeated three times.

In step S210, an ID drawing process is performed for all objects in the area of a shadow-casting object targeted for the process, excluding the shadow-casting object. Note that the processing in step S210 will be described in detail later. After step S210, the procedure proceeds to step S220, where relative positional relationships between the objects in the area of the shadow-casting object are acquired based on the ID drawing result obtained in step S210. Then, the acquired positional relationships are added as data to the related graphic list generated in step S130 of FIG. 5. As a result, the relative positional relationships between the objects, which are free from influence of the shadow-casting object, are added as data to the related graphic list.

After step S220, the procedure proceeds to step S230, where it is determined whether all the shadow-casting objects contained in the shadow-casting object list have been processed. If the determination result is that any unprocessed shadow-casting object is present, the procedure returns to step S210. On the other hand, if all of them have been processed, the related graphic acquisition process in the shadow-casting object area is completed, and the procedure proceeds to step S150 of FIG. 5. Note that in the present embodiment, a second correlation section (step) is implemented by step S210, and a positional relationship data update section (step) is implemented by step S220.

<3.3 ID Drawing Process in the Shadow-Casting Object Area>

Figure 8:
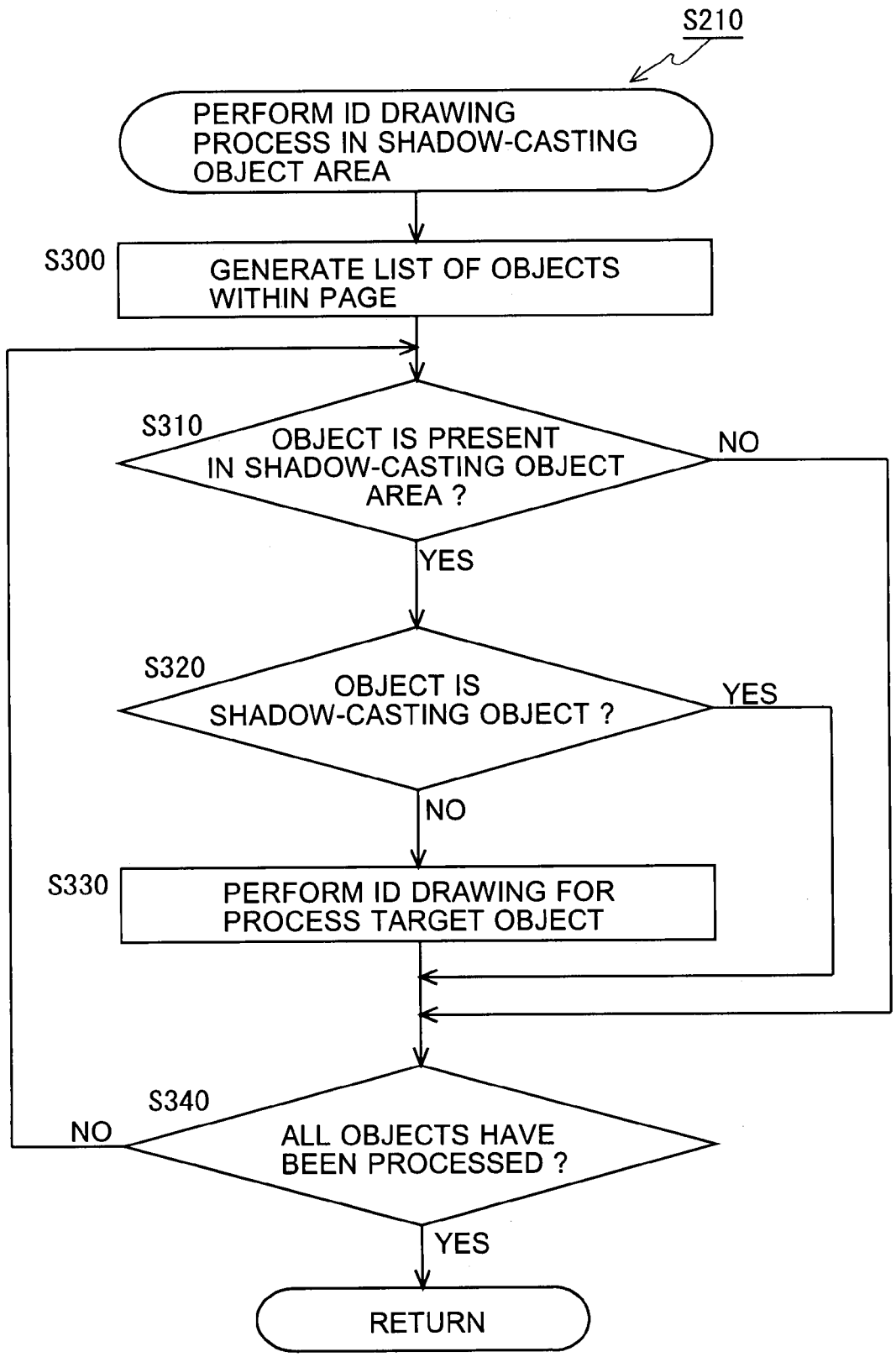
FIG. 8 is a flowchart illustrating a detailed procedure of an ID drawing process in the shadow-casting object area in the embodiment.

FIG. 8 is a flowchart illustrating a detailed procedure of the ID drawing process in the shadow-casting object area (step S210 of FIG. 7). After the ID drawing process is started, the CPU 100 first extracts all the objects contained within the page, and generates a list of the extracted objects (hereinafter, referred to as an "object list") (step S300). In the example shown in FIG. 4, an object list containing fifteen graphic objects 51 to 65 and three shadow-casting objects 41 to 43 is generated. Note that the object list presents the objects in positional order from bottom (back) to top (front). Thus, the processing from steps S310 to S340 is performed for each object in positional order from bottom (back) to top (front).

In step S310, it is determined whether an object targeted for the process is present in the area of a shadow-casting object. If the determination result is that the object is present in the area of the shadow-casting object, the procedure proceeds to step S320. On the other hand, if the object is not present in the area of the shadow-casting object, the procedure proceeds to step S340. In step S320, it is determined whether the object targeted for the process is the shadow-casting object. If the determination result is that it is the shadow-casting object, the procedure proceeds to step S340. On the other hand, if it is not a shadow-casting object, the procedure proceeds to step S330.

In step S330, ID drawing is performed for each pixel of the object targeted for the process. At this time, for any pixel in an area where a plurality of objects overlap, the ID of an object positioned relatively below (on the backside relative to)

another object is overwritten by the ID of the other object positioned relatively above (on the frontside relative to) the underlying object.

After step S330, the procedure proceeds to step S340, where it is determined whether all the objects contained in the object list have been processed. If the determination result is that any object is left unprocessed, the procedure returns to step S310. On the other hand, if all of them have been processed, the ID drawing process in the shadow-casting object area is completed, and the procedure proceeds to step S220 of FIG. 7.

The ID drawing process in the shadow-casting object area is performed in the above manner, so that a result of the ID drawing process is obtained for all the objects in the area of the shadow-casting object, excluding the shadow-casting object. Thus, in step S220 of FIG. 7, the relative positional relationships between the objects, which are free from influence of the shadow-casting object, are added to the related graphic list.

<4. Advantageous Effect>

According to the present embodiment, an ID drawing process is first performed for all objects within a page, and a related graphic list indicating relative positional relationships between the objects is generated based on the process result. Thereafter, another ID drawing process is performed for all objects in the area of a shadow-casting object, excluding the shadow-casting object, and the process result is reflected in the related graphic list. Therefore, it is made possible to acquire relative positional relationships between objects located below (on the backside relative to) the shadow-casting object. Thus, it is possible to generate trap graphics in boundary portions between the objects located below (on the backside relative to) the shadow-casting object in the area of the shadow-casting object.

In addition, the ID drawing process in the shadow-casting object area is performed for all the objects excluding the shadow-casting object. Specifically, the ID drawing process is performed not only on the objects located below (on the backside relative to) the shadow-casting object but also on objects located above (on the frontside relative to) the shadow-casting object. Therefore, it is made possible to acquire relative positional relationships between the objects located below (on the backside relative to) the shadow-casting object and the objects located above (on the frontside relative to) the shadow-casting object. Thus, it is possible to generate trap graphics in boundary portions between the objects located below (on the backside relative to) the shadow-casting object and the objects located above (on the frontside relative to) the shadow-casting object in the area of the shadow-casting object.

Figure 9A:
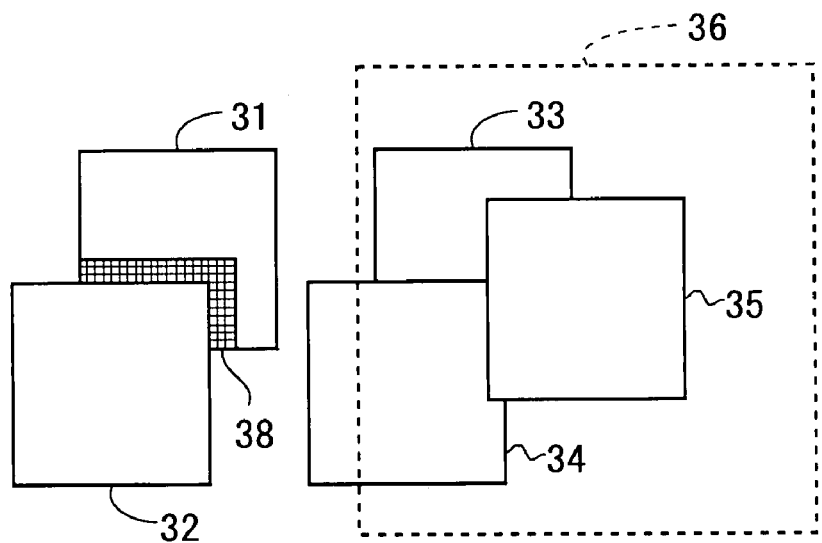
FIGS. 9A and 9B are diagrams for explaining the effect of the embodiment.
Figure 9B:
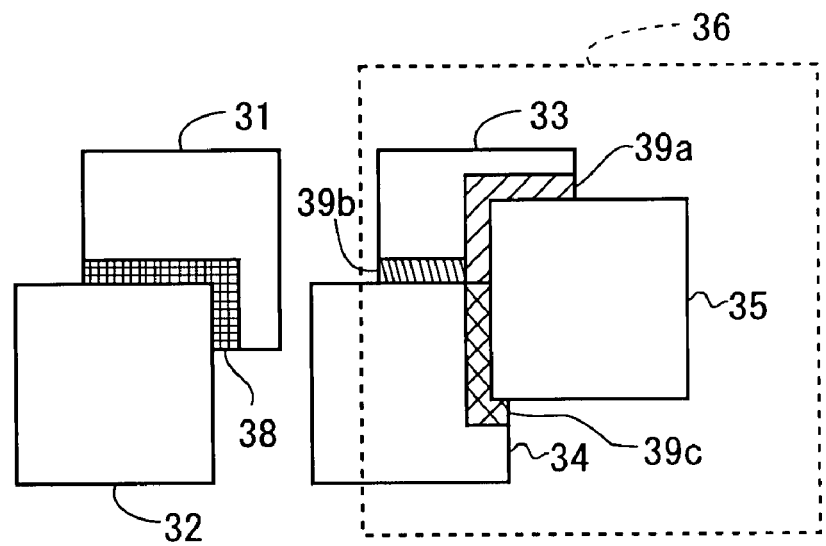

FIGS. 9A and 9B are diagrams for explaining the effect of the present embodiment. For example, when the objects as shown in FIG. 2A are present within a page, a trapping process by conventional image processing leads to a result as shown in FIG. 9A. Specifically, a trap graphic 38 is generated outside the area of the shadow-casting object 36, but no trap graphic is generated in the area of the shadow-casting object 36. On the other hand, a trapping process according to the present embodiment leads to a result as shown in FIG. 9B. Specifically, even in the area of the shadow-casting object 36, a trap graphics 39a, 39b, 39c are generated at all boundary portions between the graphic object 33 and the graphic object 34, between the graphic object 33 and the graphic object 35, and between the graphic object 34 and the graphic object 35.

Thus, according to the present embodiment, even if page data contains a shadow-casting object, it is possible to prevent an underlying portion from being exposed in a boundary portion between objects due to register movement at the time of multicolor printing.

Note that according to the procedure shown in FIG. 8, the ID of the topmost (frontmost) of all objects excluding the shadow-casting object is drawed by the ID drawing process in the shadow-casting object area. Alternatively, it is also possible to draw the ID of the topmost (frontmost) of all objects located below (on the backside relative to) the shadow-casting object in the area of the shadow-casting object. In such a case, it is not possible to acquire relative positional relationships between objects located above (on the frontside relative to) the shadow-casting object and the objects located below (on the backside relative to) the shadow-casting object, and therefore no trap graphics can be generated in boundary portions between these objects. However, it is possible to generate trap graphics in boundary portions between the objects located below (on the backside relative to) the shadow-casting object, thereby enhancing processing speed.

<5. Variant>

In the above embodiment, the ID drawing process and the related graphic list generation process in the area of a shadow-casting object are performed after the ID drawing process and the related graphic list generation process for all objects within a page, but the present invention is not limited to this. For example, the following configuration is possible.

Figure 10:
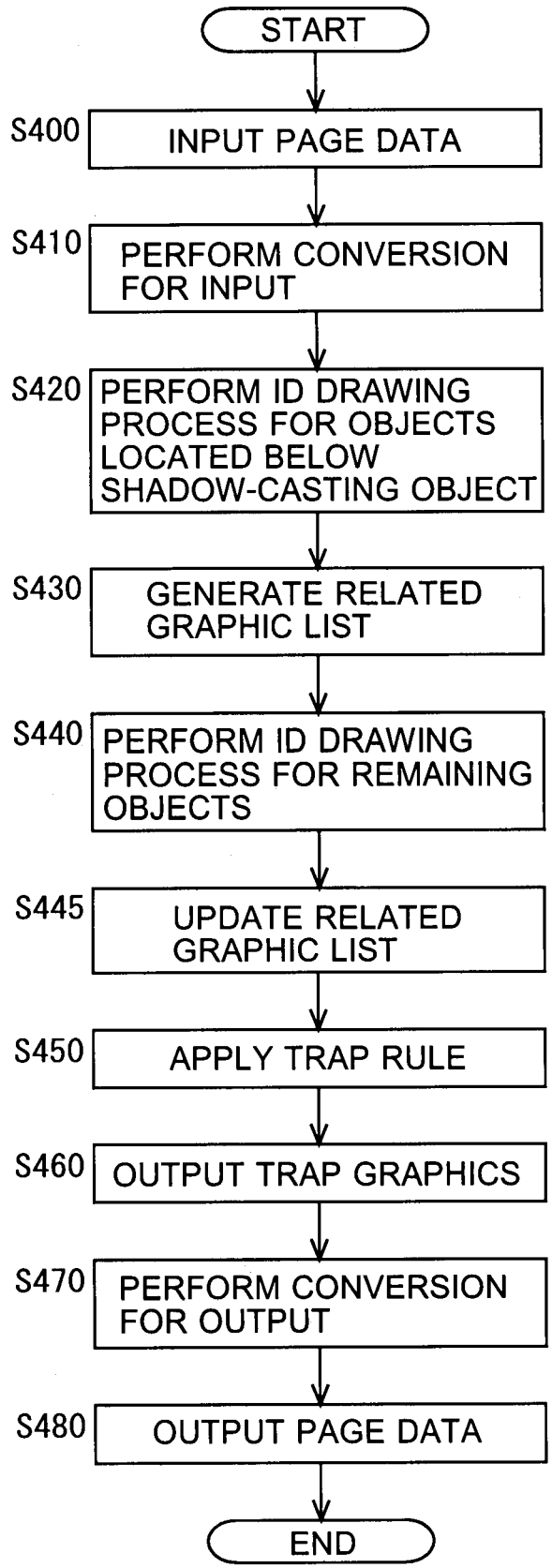
FIG. 10 is a flowchart illustrating the overall process procedure of image processing for a trapping process according to a variant of the embodiment.
Figure 11A:
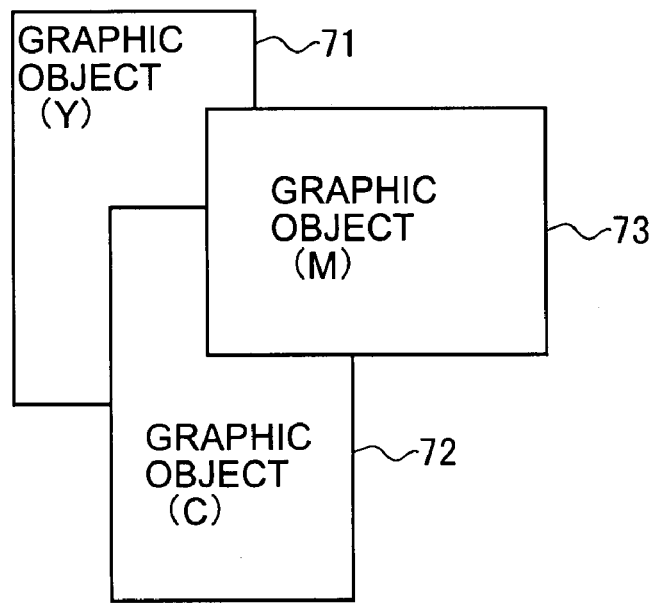
FIGS. 11A and 11B are diagrams for explaining a trapping process in a conventional example.
Figure 11B:
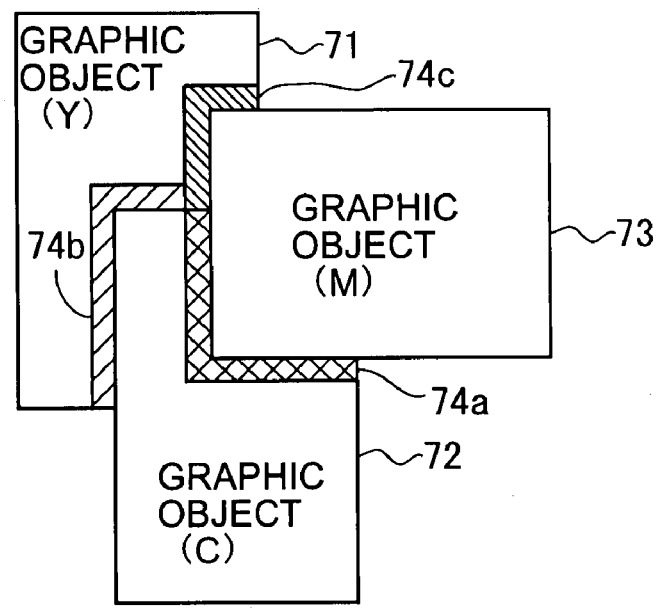
Figure 12A:
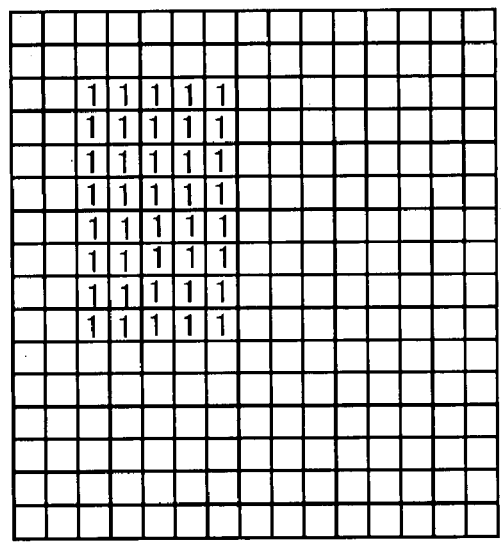
FIGS. 12A to 12C are diagrams for explaining an ID drawing process in the conventional example.
Figure 12B:
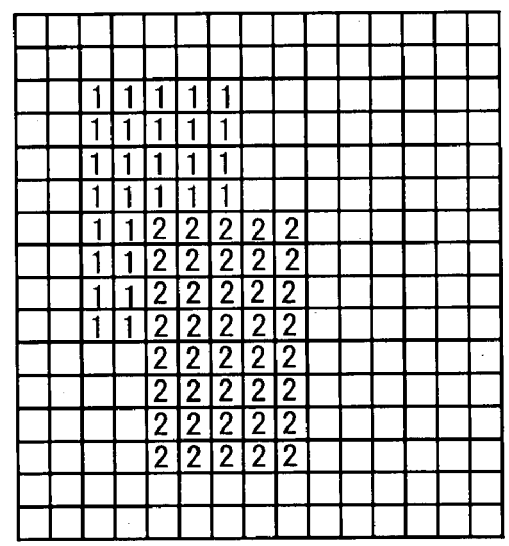
Figure 12C:
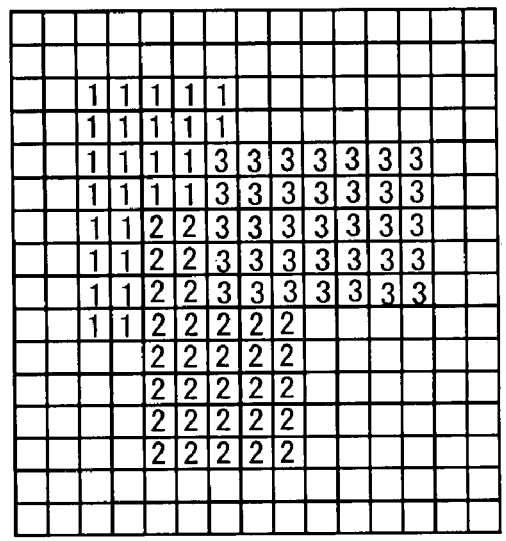
Figure 13:
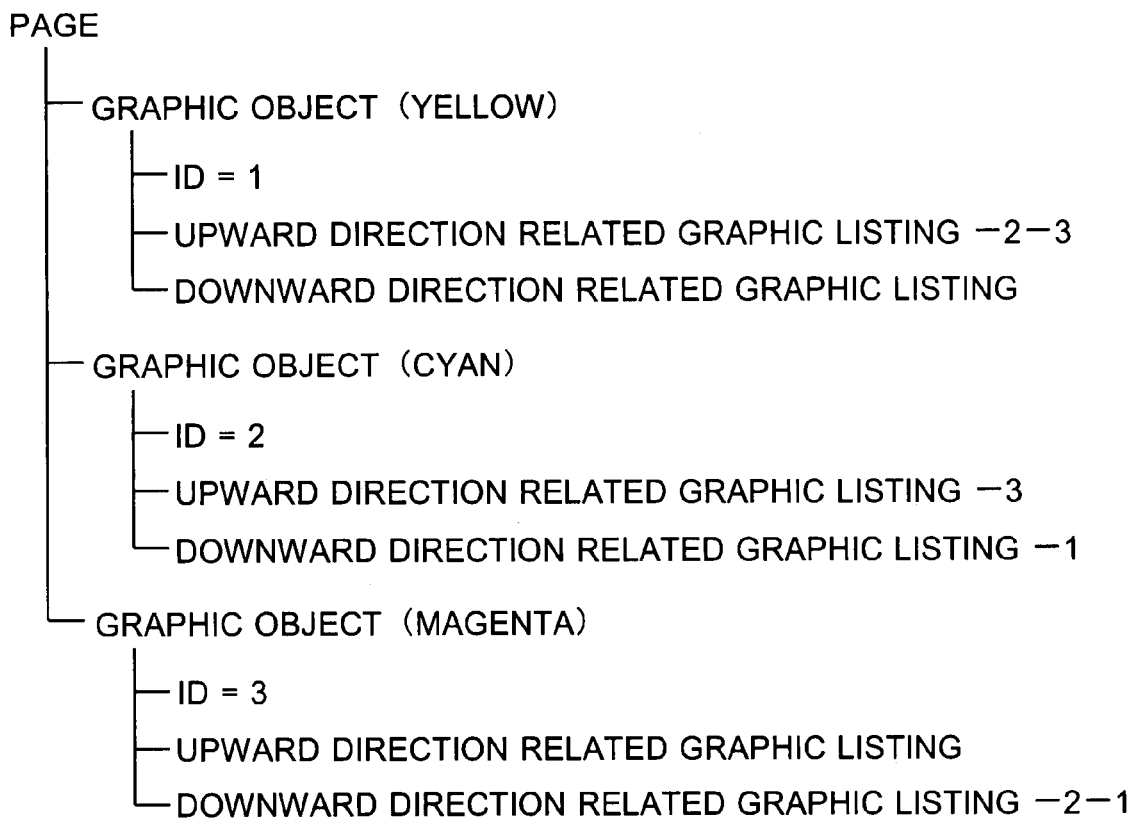
FIG. 13 is a diagram schematically illustrating a related graphic list generated in the conventional example.

FIG. 10 is a flowchart illustrating the overall process procedure of image processing for a trapping process according to a variant of the above embodiment. Note that steps S400, S410, and S450 to S490 shown in FIG. 10 are similar to steps S100, S110, and S150 to S190, respectively, shown in FIG. 5, and therefore the detailed description thereof will be omitted.

In step S420, the ID drawing process is performed for all objects within a page, excluding any shadow-casting objects and any objects located above (on the frontside relative to) the shadow-casting objects. For example, when the objects as shown in FIG. 4 are present, the ID drawing process is performed for the graphic objects 51 to 54, 56 to 59, and 61 to 64. Thereafter, a related graphic list is generated based on the ID drawing result (step S430). Thus, relative positional relationships between objects located below (on the backside relative to) the shadow-casting objects are acquired.

After the related graphic list is generated, the ID drawing process is performed for the shadow-casting objects and the objects located above (on the frontside relative to) the shadow-casting objects (step S440). In the example shown in FIG. 4, the ID drawing process is performed for the shadow-casting objects 41 to 43, and the graphic objects 55, 60, and 65. Thereafter, relative positional relationships between the objects, which are obtained based on the ID drawing result, are added as data to the related graphic list generated in step S430 (step S445).

The process procedure as described above also makes it possible to acquire relative positional relationships between the objects located below (on the backside relative to) the shadow-casting objects. Therefore, it is possible to generate trap graphics in boundary portions between the objects located below (on the backside relative to) the shadow-casting objects (e.g., the boundary portion between the graphic object 53 and the graphic object 54 in FIG. 4) in the areas of the shadow-casting objects.

Note that in the present variant, a first correlation section (step) is implemented by step S420, a positional relationship data generation section (step) is implemented by step S430, a second correlation section (step) is implemented by step S440, a positional relationship data update section (step) is implemented by step S445, and a trap graphic generation section (step) is implemented by steps S450 and S460.

In addition, in order to also generate trap graphics in boundary portions between the objects located below (on the backside relative to) the shadow-casting objects and the object located above (on the frontside relative to) the shadow-casting objects (e.g., the boundary portion between the graphic object 53 and the graphic object 55 and the boundary portion between the graphic object 54 and the graphic object 55 in FIG. 4), the ID drawing process may be performed for all the objects excluding the shadow-casting objects in step S420.

While the invention has been described in detail, the foregoing description is in all aspects illustrative and not restrictive. It is understood that numerous other modifications and variations can be devised without departing from the scope of the invention.

Note that the present application claims priority to Japanese Patent Application No. 2006-93906, titled "IMAGE PROCESSING APPARATUS AND METHOD FOR PRINTING AND PLATE MAKING, AND IMAGE PROCESSING PROGRAM FOR PRINTING AND PLATE MAKING", filed on Mar. 30, 2006, which is incorporated herein by reference.

What is claimed is:

1. An image processing apparatus for reading page data containing a plurality of objects and a translucent object, and, when two of the plurality of objects overlap, generating a trap graphic in a boundary portion between the two objects, the plurality of objects being graphics as elements constituting a print target, the apparatus comprising:
   a first correlation section for correlating each pixel in an image represented by the page data with an object that, under a predetermined condition, is topmost among objects having the pixel in their areas;
   a second correlation section for correlating each pixel located in an area of the translucent object with an object that, under a predetermined condition, is topmost among objects having the pixel in their areas; and
   a trap graphic generation section for generating the trap graphic based on a correlation result obtained by the first correlation section and a correlation result obtained by the second correlation section.

2. The image processing apparatus according to claim 1, wherein the second correlation section correlates each pixel with an object that, under a condition of being located below the translucent object, is topmost among the objects having the pixel in their areas.

3. The image processing apparatus according to claim 1, wherein the second correlation section correlates each pixel with an object that, under a condition of being other than the translucent object, is topmost among the objects having the pixel in their areas.

4. The image processing apparatus according to claim 1, wherein the first correlation section correlates each pixel with an object that, under a condition of being other than and below the translucent object, is topmost among the objects having the pixel in their areas, and
   wherein the second correlation section correlates each pixel with an object that, under a condition of not being located below the translucent object, is topmost among the objects having the pixel in their areas.

5. The image processing apparatus according to claim 1, wherein the first correlation section correlates each pixel with an object that, under a condition of being other than the translucent object, is topmost among the objects having the pixel in their areas, and
   wherein the second correlation section correlates each pixel with an object that, under a condition of not being located below the translucent object, is topmost among the objects having the pixel in their areas.

6. The image processing apparatus according to claim 1, further comprising:
   a positional relationship data generation section for generating positional relationship data, which indicates relative positional relationships between the plurality of objects, based on either one of the correlation result obtained by the first correlation section and the correlation result obtained by the second correlation section; and
   a positional relationship data update section for, after the positional relationship data is generated by the positional relationship data generation section, updating the positional relationship data based on the other one of the correlation result obtained by the first correlation section and the correlation result obtained by the second correlation section,
   wherein the trap graphic generation section generates the trap graphic based on the positional relationship data.

7. The image processing apparatus according to claim 6, wherein the positional relationship data generation section generates the positional relationship data based on the correlation result obtained by the first correlation section, and
   wherein the positional relationship data update section updates the positional relationship data based on the correlation result obtained by the second correlation section.

8. A computer-readable recording medium having recorded therein an image processing program for use with an image processing apparatus for reading page data containing a plurality of objects and a translucent object, and, when two of the plurality of objects overlap, generating a trap graphic in a boundary portion between the two objects, the plurality of objects being graphics as elements constituting a print target, the program causing the apparatus to execute:
   a first correlation step for correlating each pixel in the page data with an object that, under a predetermined condition, is topmost among objects having the pixel in their areas;
   a second correlation step for correlating each pixel located in an area of the translucent object with an object that, under a predetermined condition, is topmost among objects having the pixel in their areas; and
   a trap graphic generation step for generating the trap graphic based on a correlation result obtained by the first correlation step and a correlation result obtained by the second correlation step.

9. The computer-readable recording medium according to claim 8, wherein in the second correlation step, each pixel is correlated with an object that, under a condition of being located below the translucent object, is topmost among the objects having the pixel in their areas.

10. The computer-readable recording medium according to claim 8, wherein in the second correlation step, each pixel is correlated with an object that, under a condition of being other than the translucent object, is topmost among the objects having the pixel in their areas.

11. The computer-readable recording medium according to claim 8, wherein in the first correlation step, each pixel is correlated with an object that, under a condition of being other than and below the translucent object, is topmost among the objects having the pixel in their areas, and wherein in the second correlation step, each pixel is correlated with an object that, under a condition of not being located below the translucent object, is topmost among the objects having the pixel in their areas.

12. The computer-readable recording medium according to claim 8, wherein in the first correlation step, each pixel is correlated with an object that, under a condition of being other than the translucent object, is topmost among the objects having the pixel in their areas, and wherein in the second correlation section, each pixel is correlated with an object that, under a condition of not being located below the translucent object, is topmost among the objects having the pixel in their areas.

13. The computer-readable recording medium according to claim 8, wherein the image processing program further causing the image processing apparatus to execute:

a positional relationship data generation step for generating positional relationship data, which indicates relative positional relationships between the plurality of objects, based on either one of the correlation result obtained by the first correlation step and the correlation result obtained by the second correlation step; and a positional relationship data update step for, after the positional relationship data is generated by the positional relationship data generation step, updating the positional relationship data based on the other one of the correlation result obtained by the first correlation step and the correlation result obtained by the second correlation step, and wherein in the trap graphic generation step, the trap graphic is generated based on the positional relationship data.

14. The computer-readable recording medium according to claim 13, wherein in the positional relationship data generation step, the positional relationship data is generated based on the correlation result obtained by the first correlation step, and wherein in the positional relationship data update step, the positional relationship data is updated based on the correlation result obtained by the second correlation step.

15. An image processing method for reading page data containing a plurality of objects and a translucent object, and, when two of the plurality of objects overlap, generating a trap graphic in a boundary portion between the two objects, the plurality of objects being graphics as elements constituting a print target, the method comprising:

a first correlation step for correlating each pixel in the page data with an object that, under a predetermined condition, is topmost among objects having the pixel in their areas;

a second correlation step for correlating each pixel located in an area of the translucent object with an object that, under a predetermined condition, is topmost among objects having the pixel in their areas; and a trap graphic generation step for generating the trap graphic based on a correlation result obtained by the first correlation step and a correlation result obtained by the second correlation step.

* * * * *